US006811115B2

(12) United States Patent
Kurose

(10) Patent No.: US 6,811,115 B2
(45) Date of Patent: Nov. 2, 2004

(54) METHOD AND SYSTEM FOR SETTING HULL PARAMETER OF AIRSHIP AND METHOD OF ADJUSTING ASCENSION RATE OF THE SAME

(75) Inventor: Toyotoshi Kurose, Seki (JP)

(73) Assignee: Kawasaki Jukogyo Kabushiki Kaisha, Kobe (JP)

( * ) Notice: Subject to any disclaimer, the term of this patent is extended or adjusted under 35 U.S.C. 154(b) by 0 days.

(21) Appl. No.: 10/337,998

(22) Filed: Jan. 8, 2003

(65) Prior Publication Data

US 2003/0132343 A1 Jul. 17, 2003

(30) Foreign Application Priority Data

Jan. 15, 2002 (JP) ........................................ 2002-006130

(51) Int. Cl.[7] .............................. B64B 1/58; B64B 1/04
(52) U.S. Cl. ........................... 244/97; 244/96; 244/31; 244/128; 244/30; 701/3
(58) Field of Search ............................... 244/96, 97, 31, 244/128, 30; 701/3

(56) References Cited

U.S. PATENT DOCUMENTS

| | | | | |
|---|---|---|---|---|
| 2,524,562 | A | | 10/1950 | Dawbarn |
| 3,534,928 | A | * | 10/1970 | Tanner .......................... 244/30 |
| 5,574,647 | A | * | 11/1996 | Liden |
| 5,890,676 | A | * | 4/1999 | Coleman et al. .............. 244/30 |
| 5,952,961 | A | * | 9/1999 | Denninger |
| 6,163,744 | A | * | 12/2000 | Onken et al. .................. 701/3 |
| 6,182,924 | B1 | | 2/2001 | Nott |
| 6,247,943 | B1 | * | 6/2001 | Moga et al. |
| 6,328,257 | B1 | * | 12/2001 | Schafer ......................... 244/30 |
| 6,427,943 | B2 | | 8/2002 | Yokomaku et al. |
| 6,466,891 | B1 | * | 10/2002 | Carter et al. |
| 6,480,788 | B2 | * | 11/2002 | Kilfeather et al. |
| 6,560,536 | B1 | * | 5/2003 | Sullivan et al. |
| 6,575,403 | B1 | * | 6/2003 | Monroe ......................... 244/31 |
| 6,609,680 | B2 | * | 8/2003 | Perry et al. .................... 244/30 |
| 6,614,394 | B2 | * | 9/2003 | Honda et al. |
| 6,619,586 | B1 | * | 9/2003 | Barnes, III .................... 244/97 |

FOREIGN PATENT DOCUMENTS

| | | |
|---|---|---|
| DE | 198 49 230 A1 | 4/2000 |
| DE | 200 11 295 U1 | 6/2001 |
| FR | 2 748 085 A1 | 10/1997 |
| FR | 2 807 736 A1 | 10/2001 |
| JP | 2000-312375 | 11/2000 |
| WO | WO 88/00555 A1 | 1/1988 |

* cited by examiner

Primary Examiner—Michael Carone
Assistant Examiner—L. Semunegus
(74) Attorney, Agent, or Firm—Oliff & Berridge, PLC

(57) ABSTRACT

A method comprises: launching observation means configured to observe upper air environment immediately before launching an airship to acquire ambient air data on the actual conditions of the upper ambient air including altitude, pressure, wind direction, wind speed and temperature; determining an ascension profile for the airship by simulation using the ambient air data on the actual conditions of the ambient air; determining an initial quantity of Helium gas conforming to the actual conditions of the ambient air; and adjusting the quantity of Helium gas in the Helium room to the initial quantity of Helium gas to set an initial buoyancy. The method sets hull parameters for the hull of the airship to provide an ascension profile conforming to the actual conditions of the ambient air.

11 Claims, 13 Drawing Sheets

TEMPERATURE OF THE UPPER AMBIENT AIR

INITIAL BUOYANCY: 50 kgf

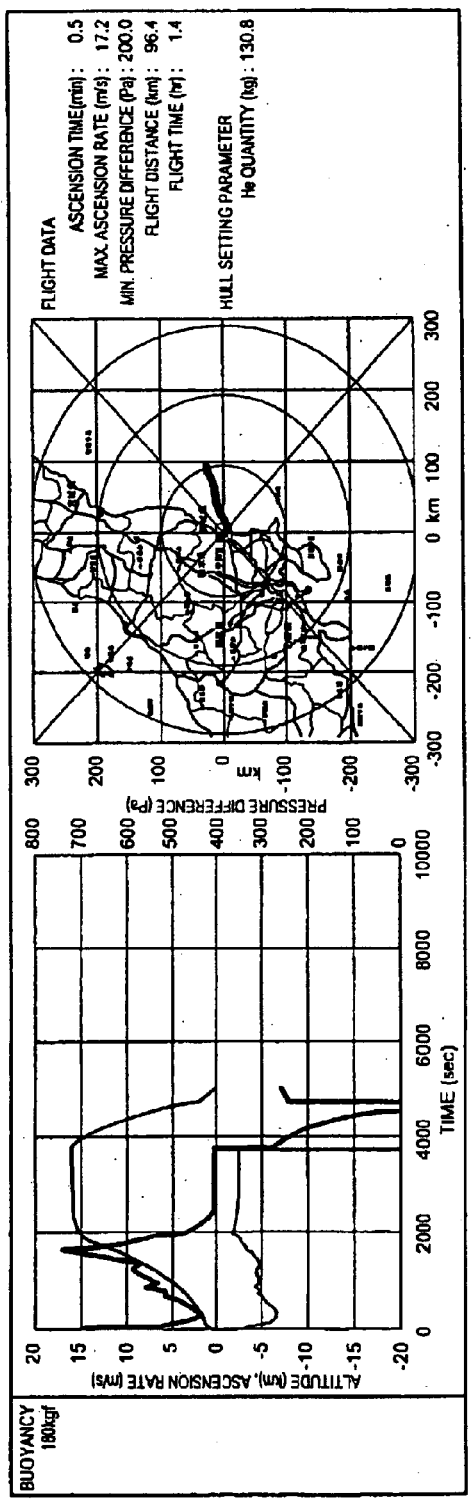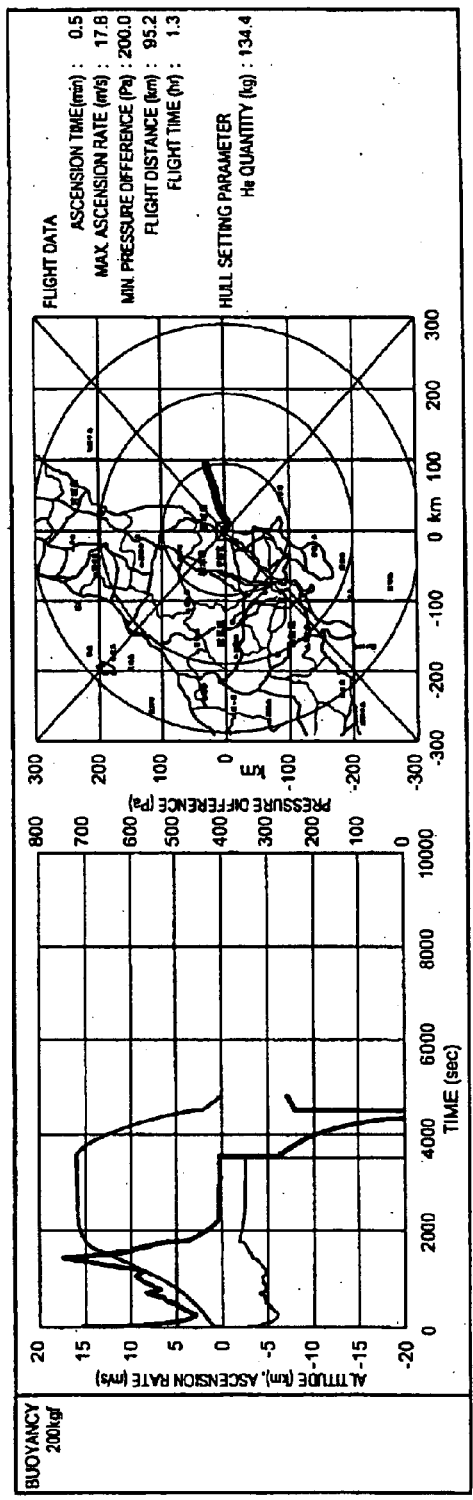
FIG. 4I
FIG. 4J

METHOD AND SYSTEM FOR SETTING HULL PARAMETER OF AIRSHIP AND METHOD OF ADJUSTING ASCENSION RATE OF THE SAME

BACKGROUND OF THE INVENTION

1. Field of the Invention

The present invention relates to a hull parameter setting method of setting suitable hull parameters characterizing the hull of an airship that ascends and descends at high altitudes in the stratosphere through buoyancy control in conformity with the actual conditions of ambient air, a hull parameter setting system for carrying out the method, and a method of adjusting the ascension rate of the airship for which hull parameters are set.

2. Description of the Related Art

An airship that ascends and descends at high altitudes in the stratosphere through buoyancy control is a very large aerial vehicle provided with a Helium room filled with Helium gas and an air room filled with air, and having a diameter of several tens meters and a length (height) in the range of several tens to several hundreds meters. Referring to FIG. 6 showing a conventional airship 1, the airship 1 has a hull provided with a Helium room 2 and an air room 3 separated from the Helium room 2. When the pressure difference between the interior and the exterior of the hull increases as the airship 1 ascends, air is discharged through a relief valve 5 to reduce hull density. The airship 1 continues to ascend until the air contained in the air room of the hull is exhausted. As the airship 1 ascends and the air is discharged from the hull, the air and the Helium gas contained in the hull expand and the respective temperatures of the air and the Helium gas decreases accordingly. Consequently, the air and the Helium gas become unable to expand, air discharge rate at which the air is discharged from the hull decreases, and the ascension rate decreases. Thermal energy is supplied to the airship 1 by radiation from the sun and the earth and by transfer from the atmosphere to raise the respective temperatures of the air and the Helium gas contained in the hull. Consequently, the temperature of the air rises, the air expands, the air is discharged, and the airship 1 continues to ascend. Shown in FIG. 6 are an air temperature/differential pressure sensor 6 capable of measuring the temperature of the air in the hull and the pressure difference, a motor-operated Helium valve 6, a Helium temperature/pressure difference sensor 7, an atmosphere temperature/moisture sensor 8, a skin temperature sensor 9, and on-board equipment 10.

The conventional airship 1 is designed so as to be capable of ascending in the standard atmosphere having a standard atmospheric density gradient specifying an average atmospheric environment. The ascending performance of the airship 1 is greatly dependent on the rate of change of the density of the atmosphere surrounding the airship 1. Atmospheric density decreases with altitude. In the actual atmospheric environment, the reduction rate of atmospheric density is affected by land and maritime meteorological factors including seasonal factors, and geographical factors. The atmospheric density decreases at different reduction rates on different days, at different times and at different places, respectively. If the atmospheric temperature distribution has a part of discontinuity where the atmospheric temperature does not decrease monotonously with altitude, i.e., if the atmosphere has a temperature inversion layer where the atmospheric temperature rises with altitude, the reduction rate of atmospheric density increases sharply in the temperature inversion layer. Consequently, the buoyancy of the airship under buoyancy control decreases and the airship is unable to ascend past the temperature inversion layer and stays at the same altitude for some time, which extends time necessary for the airship to ascend to a desired altitude.

The occurrence of the temperature inversion layer will be described with reference to FIGS. 7A to 9B showing graphs simulating the actual conditions of the atmosphere at 9 am in May and June of 1995 at Nemuro, Hokkaido. The graphs shown in FIGS. 7A, 8A and 9A show the variation of temperature with altitude, and the graphs shown in FIGS. 7B, 8B and 9B show the relation between altitude, speed, pressure difference, and time elapsed after the airship has started ascending. As obvious from FIG. 7A, temperature decreased monotonously with altitude. The relative frequency of days where ascending time is 1 hr (3600 s) or below as shown in FIG. 7B in sixty-one days in May and June was 16.4% (ten days). None of the sixty-one days in May and June satisfied airship ascending test conditions including a surface wind velocity of 5 m/s or below and a cloud amount of 40% or below. As obvious from FIG. 8A, the temperature gradient had a discontinuous part at altitudes in the range of 1 to 2 km. The airship was caught temporarily by the temperature inversion layer during ascension, and the relative frequency of days where ascending time was in the range of 1 to 2 hr as shown in FIG. 8B in sixty-one days in May and June was 72.1% (forty-four days). As shown in FIG. 9A, the temperature gradient had a discontinuous part at altitudes in the range of 0 to 2 km. The airship stayed for some time in the temperature inversion layer during ascension, and the relative frequency of days where ascending time was not shorter than 2 hr as shown in FIG. 9B in sixty-one days in May and June was 11.5% (seven days). As apparent from those graphs, temperature inversion layers occur frequently. Therefore, the conventional method of controlling the buoyancy of an airship on the basis of the standard atmospheric conditions is unable to make the airship exercise necessary ascending performance.

The ascension rate of the airship is dependent on the general effect of the expansion/compression of the air and the Helium gas in the hull, the amount of thermal energy given to the airship by solar radiation, the rate of heat exchange between the airship and the atmosphere by convection, the rate of heat exchange between the airship and the earth, the universe and the atmosphere, air supply to and air discharge from the hull, and the aerodynamic ability of the hull. Therefore, proper hull parameters must be set, grasping those factors affecting the ascension rate. However, the airship is unable to ascend according to a proper ascension profile unless the hull parameters conform to the actual ambient air conditions immediately before starting ascension.

SUMMARY OF THE INVENTION

Accordingly, it is an object of the present invention to provide a method of setting suitable parameters of the hull of an airship such that the airship is able to ascend according to a proper ascension profile conforming to the actual conditions of ambient air, a system for carrying out the method, and a method of adjusting the ascension rate of the airship.

A first aspect of the present invention is a hull parameter setting method of setting parameters of a hull of an airship provided with a Helium room and an air room separate from said Helium room, comprising: launching observation means configured to observe upper air environment immediately before launching said airship in order to acquire ambient air data on actual conditions of upper ambient air including altitude, pressure, wind direction, wind speed and temperature; determining an ascension profile for said airship by a simulation using said ambient air data on said actual conditions of said ambient air; determining an initial quantity of a Helium gas in said Helium room of said airship conforming to said actual conditions of said ambient air; and adjusting a quantity of said Helium gas contained in said Helium room to said initial quantity of said Helium gas to set an initial buoyancy.

Preferably, the hull parameter setting method further comprises: observing changes in said upper ambient air with a meteorological observation instrument in a period between a completion of adjustment of said initial quantity of said Helium gas and a launching of said airship after acquisition of said ambient air data on said actual conditions of said ambient air using said observation means; correcting said ascension profile for said airship by a simulation using both said ambient air data on said actual conditions of said ambient air and a data on said upper ambient air obtained by observing said changes in said upper ambient air with said meteorological observation instrument; determining an initial quantity of Helium gas in said Helium room conforming to latest conditions of said upper ambient air; and adjusting said quantity of Helium gas in said Helium room to said initial quantity of Helium gas to set said initial buoyancy.

Preferably, said observation means includes a GPS sonde.

A second aspect of the present invention is a hull parameter setting system for setting hull parameters for a hull of an airship comprising: an observation system including means configured to observe upper air environment that is launched in order to obtain ambient air data on actual conditions of an upper ambient air including altitude, pressure, wind direction, wind speed and temperature; a simulator installed on a ground to determine an ascension profile for said airship by a simulation using said ambient air data on said actual conditions of said upper ambient air provided by said observation system and to determine an initial quantity of Helium gas in said Helium room conforming to said actual conditions of said upper ambient air; and a Helium gas controller installed on said ground or said hull to adjust a quantity of Helium gas in said Helium room according to said initial quantity of Helium gas determined by said simulator.

Preferably, the hull parameter setting system further comprises a meteorological observation system including a meteorological observation instrument for observing changes in said upper ambient air in a period between a completion of adjustment of said quantity of Helium gas and a launching of said airship after said acquisition of said ambient air data on said actual conditions of ambient air and sending a data on said upper ambient air obtained by said meteorological observation system to said simulator.

Preferably, said observation means includes a GPS sonde.

A third aspect of the present invention is an ascension rate adjusting method adapted to be used to adjust an ascension rate of an airship of which hull parameters are set by said hull parameter setting method, wherein said ascension rate at which said airship ascends is adjusted according to changes in actual conditions of ambient air by adjusting a number of air relief valves to be operated among a plurality of air relief valves of said airship or adjusting characteristics of said air relief valves to adjust air discharge rate.

Preferably, said observation means includes a GPS sonde.

A fourth aspect of the present invention is an ascension rate adjusting method adapted to be used to adjust an ascension rate of an airship of which hull parameters have been set by said hull parameter setting method, wherein said airship is loaded with a ballast if said airship has a spare takeoff weight, and said ballast is thrown out when said ascension rate of said airship decreases during ascension to increase a buoyancy of said airship and to increase an ascending ability of said airship.

Preferably, said ballast includes water.

Preferably, said observation means includes a GPS sonde.

BRIEF DESCRIPTION OF THE DRAWINGS

The above and other objects, features and advantages of the present invention will become more apparent from the following description taken in connection with the accompanying drawings, in which:

FIGS. 4A to 4J are diagrams showing ascension profiles determined by simulation using data determined by setting places, dates and times for stratospheric flight tests by a hull parameter setting method as an embodiment according to the present invention;

DESCRIPTION OF THE PREFERRED EMBODIMENTS

A hull parameter setting method of setting suitable hull parameters characterizing the hull of an airship, a hull parameter setting system for carrying out the hull parameter setting method, and a method of adjusting the ascension rate of the airship for which hull parameters are set as embodiments according to the present invention will be described hereunder.

Figure 1:
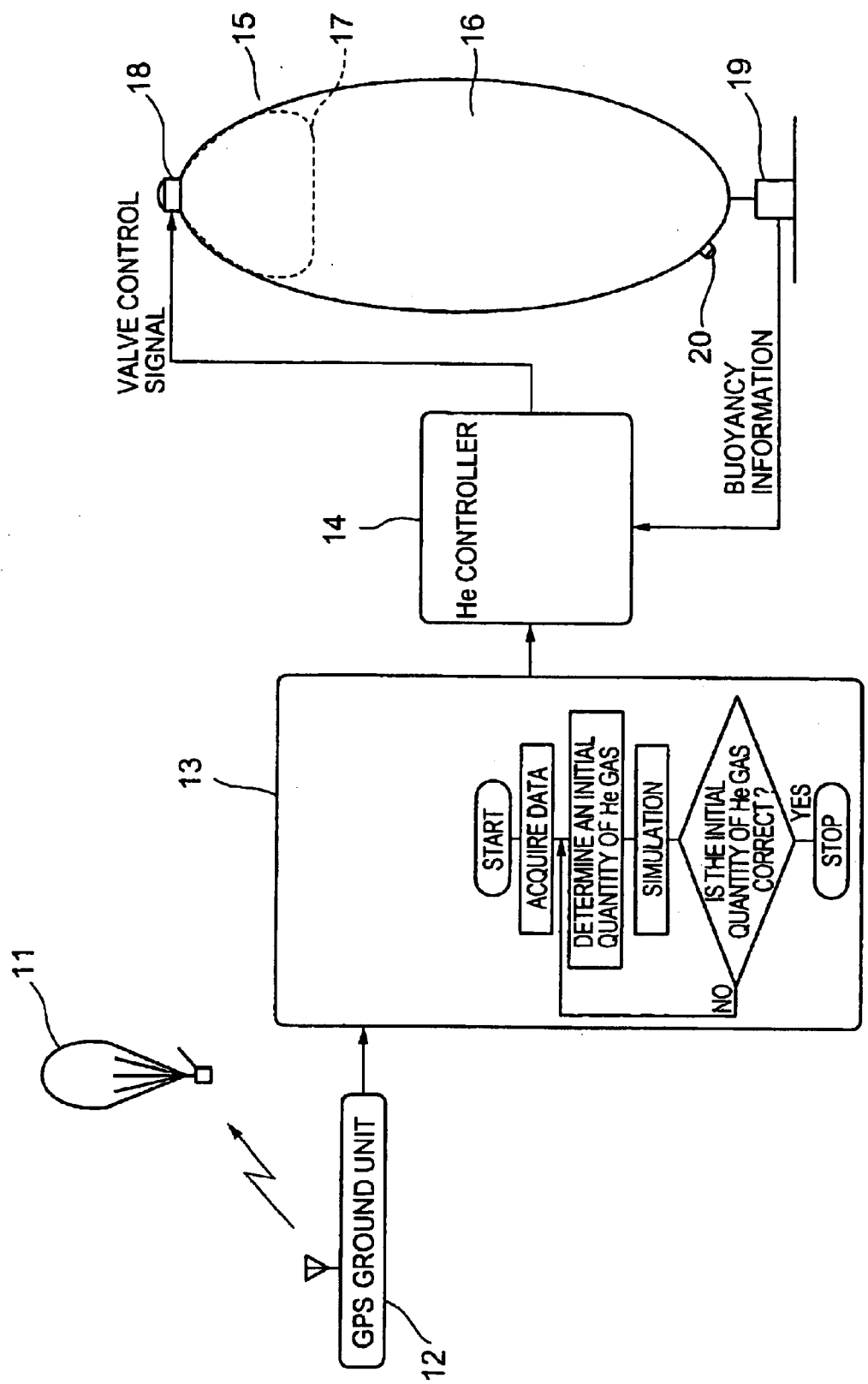
FIG. 1 is a block diagram of a hull parameter setting system as an embodiment according to the present invention for setting parameters of the hull of an airship.

A hull parameter setting system as an embodiment according to the present invention will be described with reference to FIG. 1. An observation system includes a GPS sonde 11 that tests meteorological conditions at high altitudes above the earth's surface, and a GPS ground unit 12 that receives ambient air data on actual conditions of ambient air including altitude, pressure, wind direction, wind speed temperature and such from the GPS sonde 11.

The GPS sonde 11 is an example of the observation means configured to observe upper air environment of the present invention. The observation means may be a sonde of another type instead of the GPS sonde. Moreover, the observation means may be an airplane for observation.

An airship 15 has a Helium room 17 provided with a motor-operated valve 18, and an air room 16. A simulator 13 installed on the ground determines an ascension profile for the airship 15 on the basis of the ambient air data on the actual conditions of the upper ambient air received by the GPS ground unit 12 and determines an initial quantity of Helium gas to be initially filled in the Helium room 17 in conformity with the actual conditions of the upper ambient air. A Helium controller 14 is installed either on the ground or in the hull of the airship 15. The Helium controller 14 adjusts the quantity of Helium contained in the Helium room 17 to the initial quantity of Helium gas determined by the simulator 13. The Helium controller 14 gives control signals to the motor-operated valve 18 to control the motor-operated valve 18 for the adjustment of the quantity of Helium gas contained in the Helium room 17. The Helium room 17 is filled with a quantity of Helium gas including an excess quantity of Helium gas beforehand. The Helium controller 14 receives buoyancy information from a buoyancy measuring load cell 19. The hull is provided with air relief valves 20.

A hull parameter setting method as an embodiment according to the present invention to be carried out by the hull parameter setting system will be described. The GPS sonde 11 is launched up to high attitudes before launching the airship 15 having the air room 16 and the independent Helium room 17. The GPS ground unit 12 starts continuous reception of measured ambient air data on attitude, pressure, wind direction, wind speed, temperature and such from the GPS sonde 11 immediately after the GPS sonde 11 has been launched. The GPS ground unit 12 sends the measured ambient air data to the simulator 13. The simulator 13 determines an ascension profile for the airship 15 on the basis of the measured ambient air data by simulation, and an initial quantity of Helium gas to be filled in the Helium room 17 in conformity with the actual conditions of the upper ambient air surrounding the airship 15. The initial quantity of Helium gas determined by the simulator 13 is sent to the Helium controller 14. Then, a control signals for controlling the motor-operated valve 18 of the Helium room 17 is given to the motor-operated valve 18 to adjust the quantity of Helium gas contained in the Helium room 17 of the airship 15 to the initial quantity of Helium gas. Thus, an initial buoyancy of the airship 15 is set. Since time necessary for completing the simulation and initial buoyancy setting is on the order of 30 min, an optimum ascension profile conforming to the actual conditions of ambient air can be determined for the airship 15 immediately before launching.

Figure 2A:
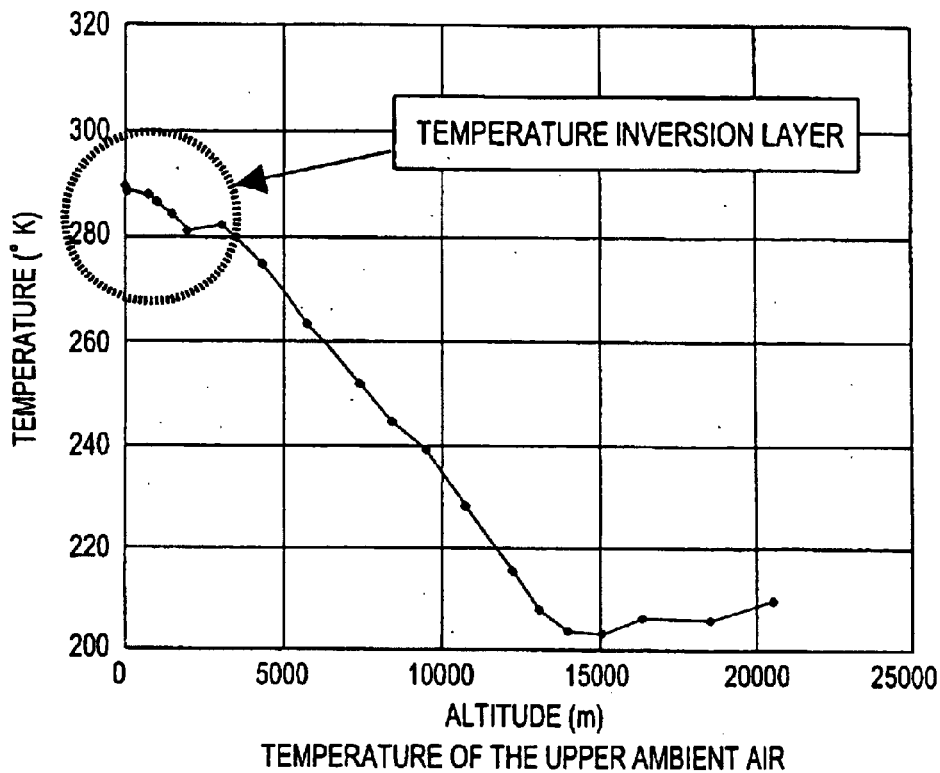
FIGS. 2A, 2B, 2C and 2D are graphs of assistance in explaining a hull parameter setting method as an embodiment according to the present invention.
Figure 2B:
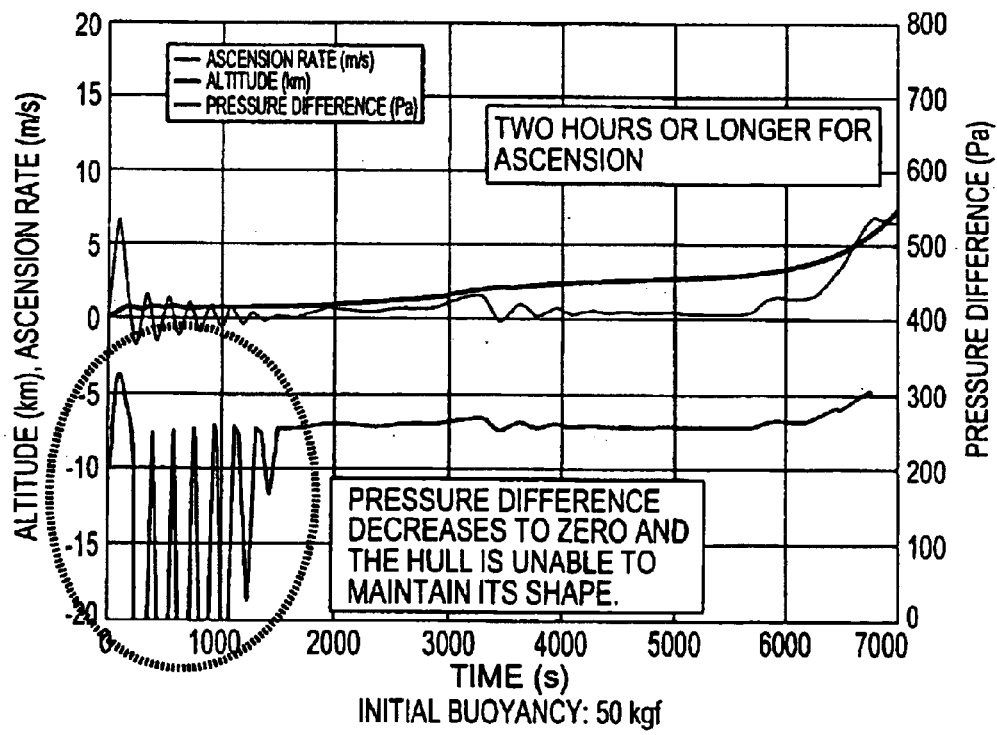
Figure 2C:
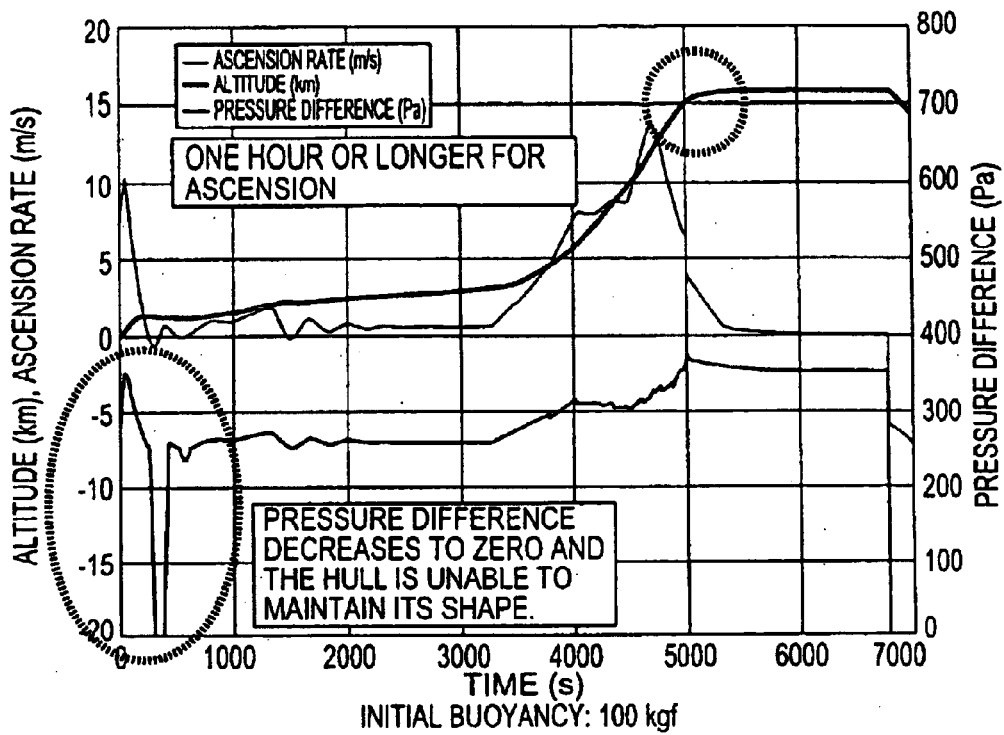
Figure 2D:
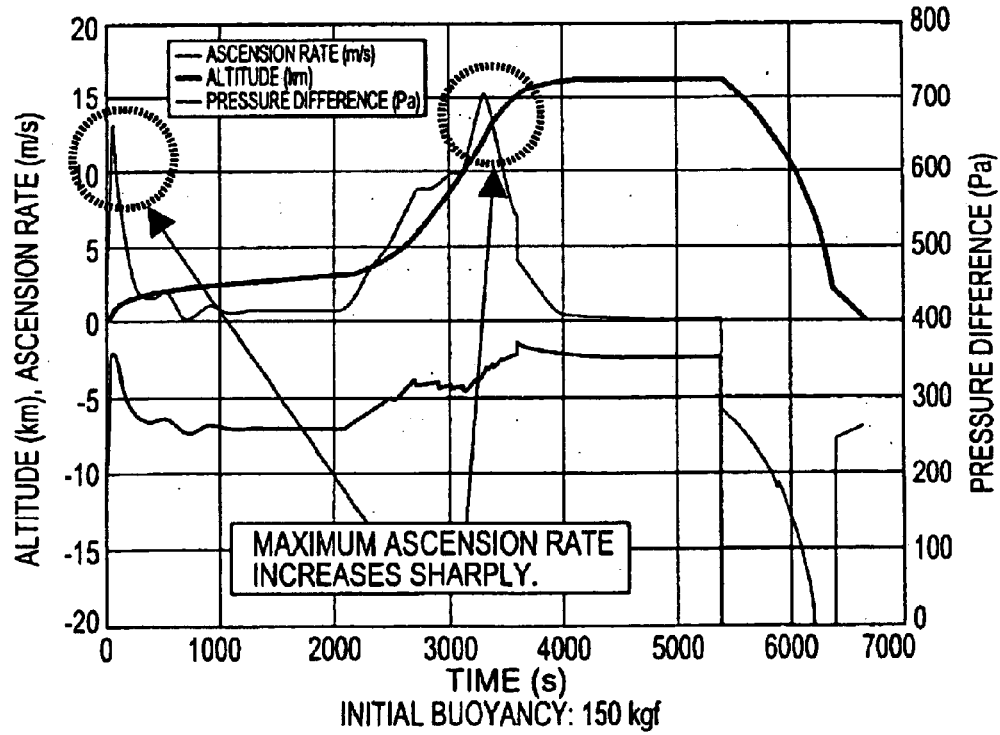

A hull parameter setting method as an embodiment according to the present invention will be described with reference to FIGS. 2A to 2D. The GPS sonde 11 was launched to a high altitude before launching the airship 15 shown in FIG. 1 and the GPS ground unit 12 started continuously receiving measured data on the actual conditions of the upper ambient air from the GPS sonde 11 immediately after the launching of the GPS sonde 1. It was found that there was a temperature inversion layer where the atmospheric temperature does not rise monotonously with altitude at an altitude as shown in FIG. 2A. As mentioned above, the buoyancy of the airship 15 decreases in the temperature inversion layer and the ascension rate of the airship 15 decreases accordingly. Consequently, time necessary for the airship 15 to reach a desired altitude increases. Measured data on the actual conditions of the upper ambient air is sent to the simulator 13, the simulator 13 determines an ascension profile for the airship 15 by simulation, determines an initial quantity of Helium gas to be initially filled in the Helium room 17 conforming to the conditions of the upper ambient air and sends a signal representing the initial quantity of Helium gas to the Helium controller 14. The Helium controller 14 controls the motor-operated valve 18 to set an initial buoyancy by adjusting the quantity of Helium gas contained in the Helium room 17. If a wrong initial buoyancy of, for example, 50 kgf is set as shown in FIG. 2B, the pressure difference between the interior and the exterior of the airship 15 at the altitude where the temperature inversion layer is formed becomes zero, and the airship 15 is unable to maintain the shape of the hull, and the airship 15 takes two or more hours to ascend past the temperature inversion layer. Even in a case where the initial buoyancy is set at 100 kgf as shown in FIG. 2C, the temperature difference between the interior and the exterior of the airship 15 at the altitude where the temperature inversion layer is formed becomes zero, the airship 15 is unable to maintain the shape of the hull, and the airship 15 takes time exceeding one hour to ascend past the temperature inversion layer. When the initial buoyancy is set properly, for example, at 150 kgf as shown in FIG. 2D so that the maximum ascension rate is not excessively high, the airship 15 is able to ascend to a desired altitude in a time on the order of 1 hr. Thus, an optimum ascension profile conforming to the actual conditions of ambient air that does not make the airship 15 stay long in the temperature inversion layer is determined.

Figure 3:
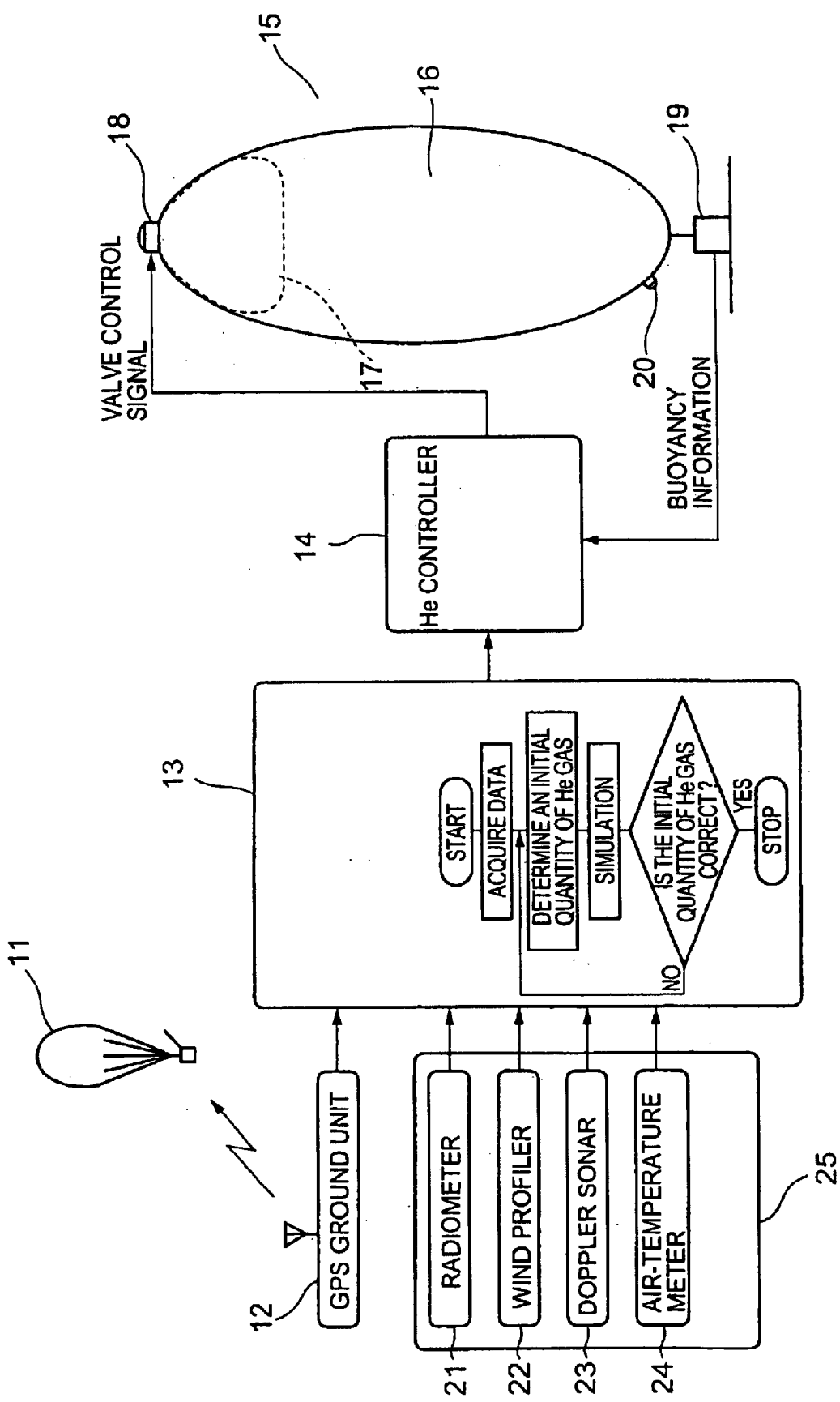
FIG. 3 is a block diagram of a hull parameter setting system as another embodiment according to the present invention for setting parameters of the hull of an airship.
Figure 4A:
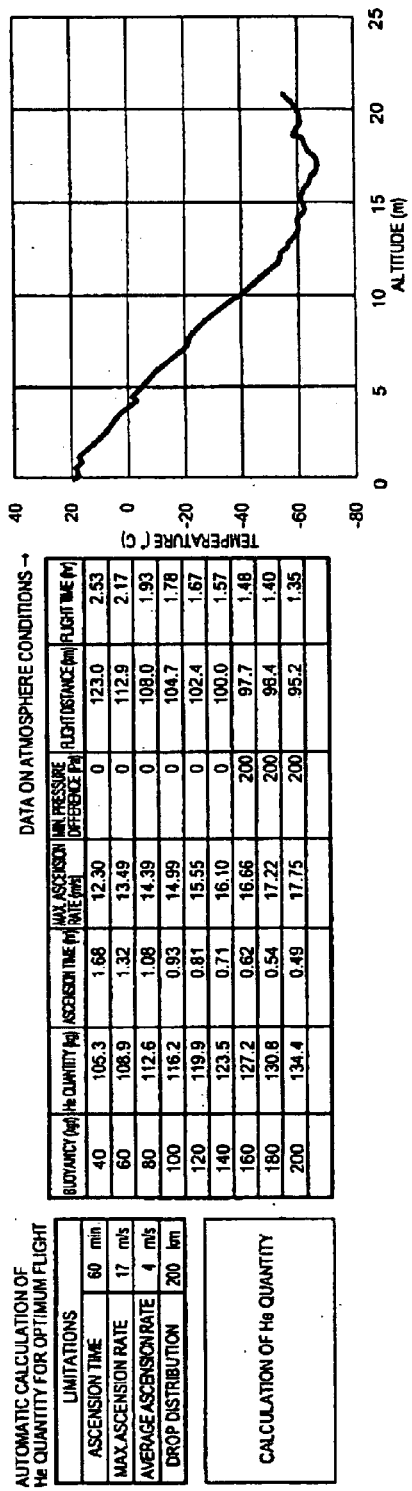
Figure 4B:
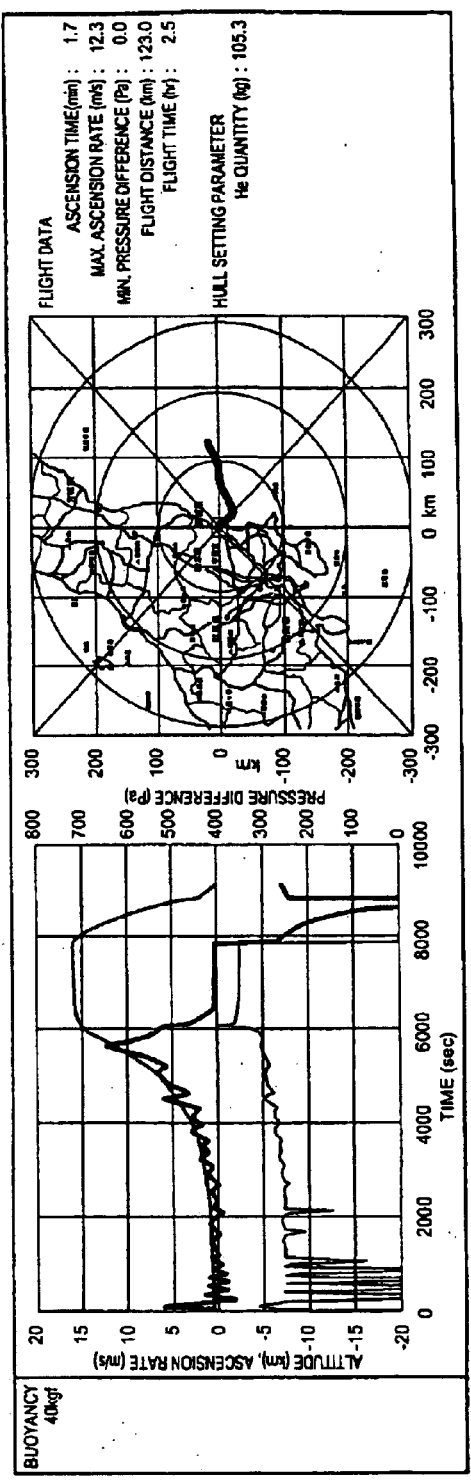
Figure 4C:
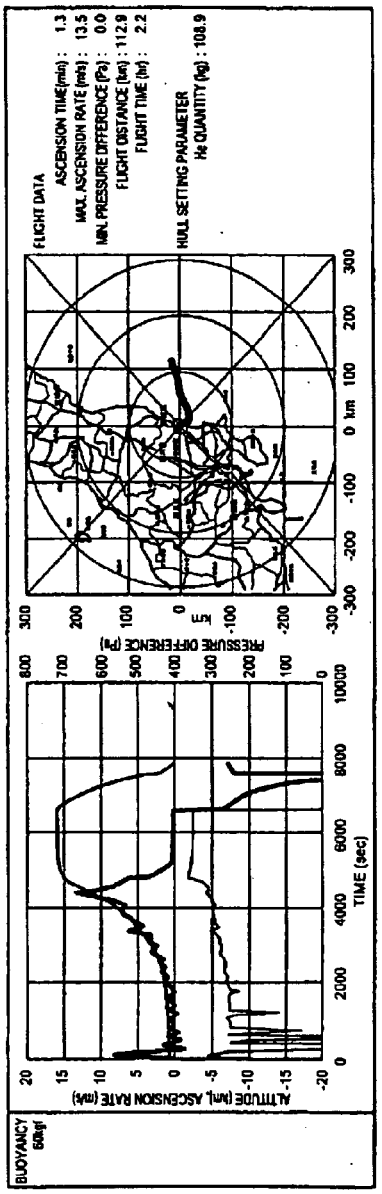
Figure 4D:
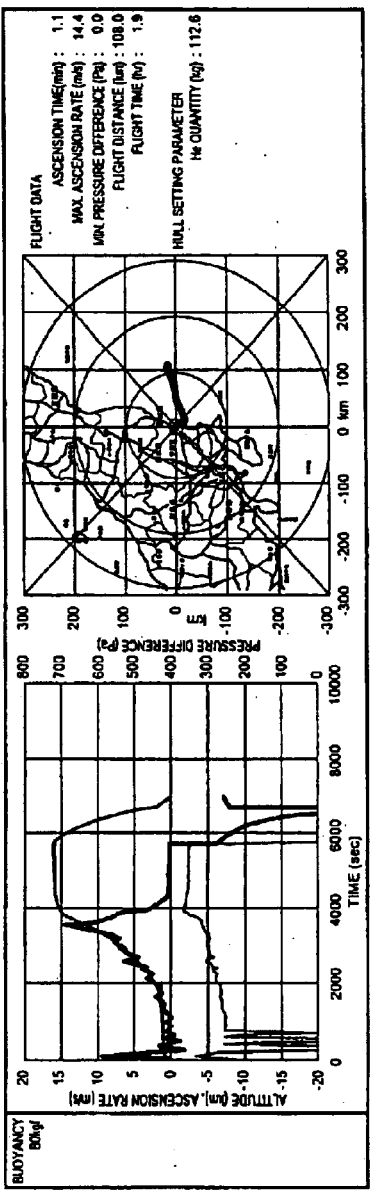
Figure 4E:
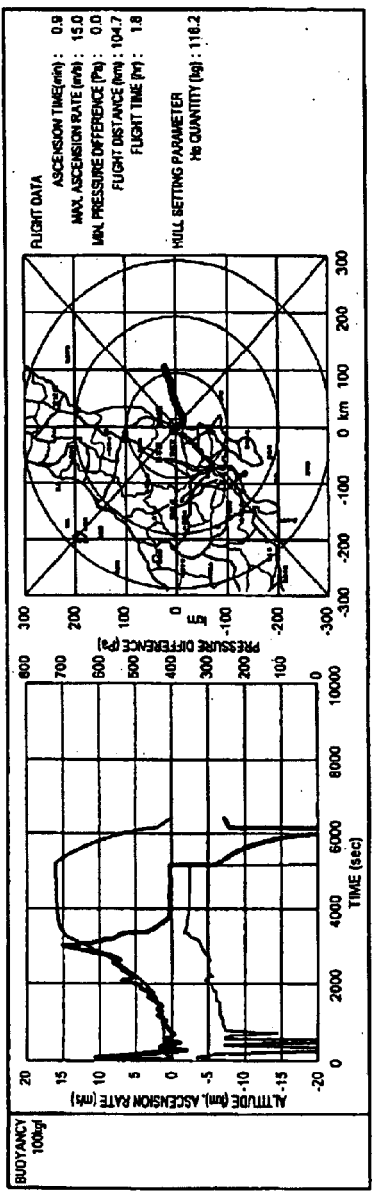
Figure 4F:
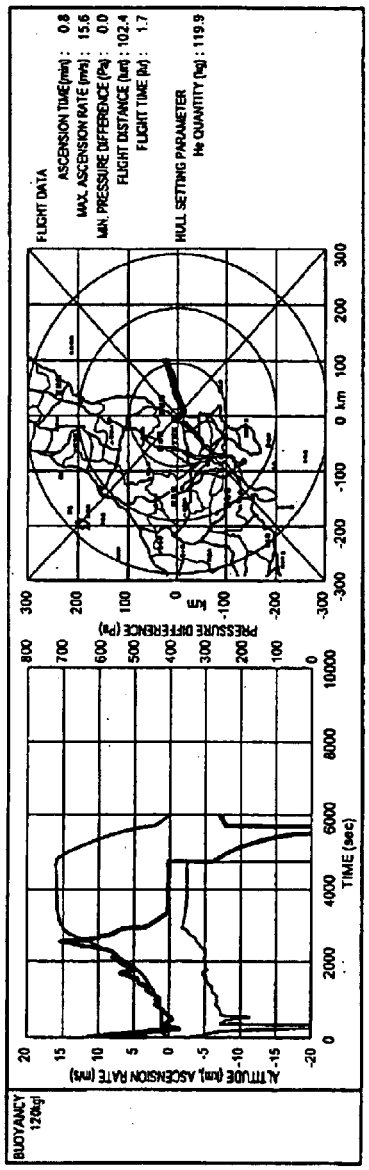
Figure 4G:
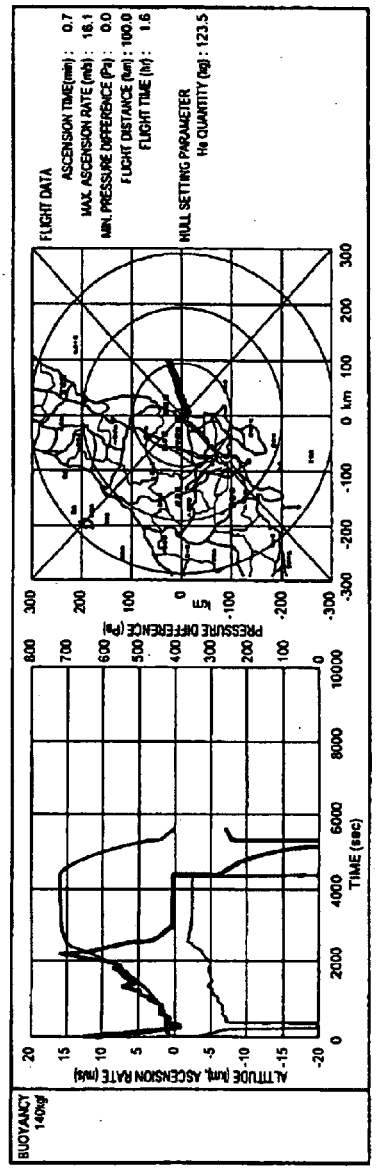
Figure 4H:
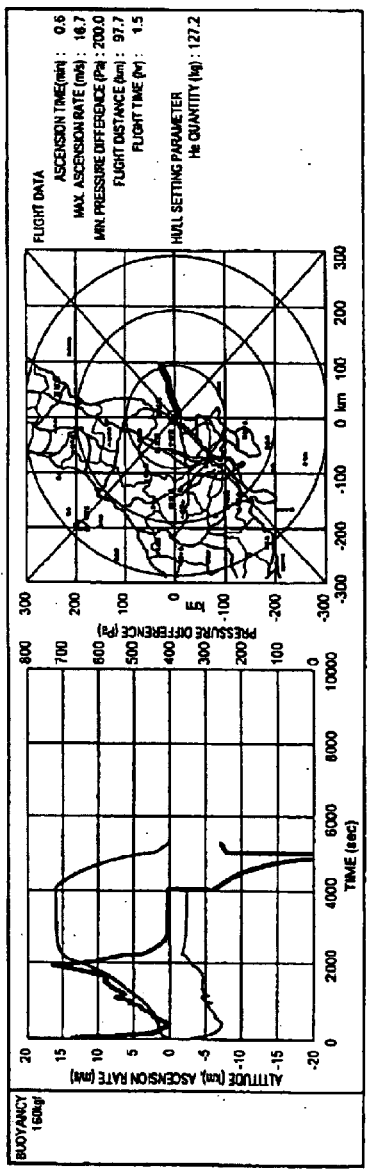

Another hull parameter setting system that carries out another hull parameter setting method as an embodiment according to the present invention will be described with reference to FIG. 3. This hull parameter setting system comprises, in addition to the components of the hull setting parameter setting system shown in FIG. 1, a meteorological observation system 25. Changes in actual conditions of the upper ambient air are measured by meteorological observation instruments included in the meteorological observation system 25 in a period between the completion of Helium quantity adjustment and the launching of an airship 15 after a GPS ground unit 12 has received data on actual conditions of the upper ambient air, and the meteorological observation system 25 sends data representing changes in actual conditions of the upper ambient air to a simulator 13.

Another hull parameter setting method to be carried out by the hull parameter setting system shown in FIG. 3 will be described. The present hull parameter setting method, similarly to the foregoing hull parameter setting method, determines an optimum ascension profile conforming to actual conditions of the upper ambient air before the airship 15 is launched. Actual conditions of the upper ambient air change in a period between the completion of Helium quantity adjustment and the launching of the airship 15. The upper ambient air is observed by the meteorological observation instruments in a period between the acquisition of data on the actual conditions of the upper ambient air and the launching of the airship 15 to correct the ascension profile according to changes in the actual conditions of the upper ambient air. A radiometer 21 measures the radiant intensities of the sum and the atmosphere, a wind profiler 22 and a Doppler sonar 23 measure wind direction and wind speed in the upper ambient air, a wind vane and anemometer measure surface wind direction and surface wind speed, and an air-temperature meter 24 measures surface temperature. The meteorological observation system 25 sends measured meteorological data to the simulator 13. The simulator 13 executes a simulation using the meteorological data received from the meteorological observation system 25 in addition to the data on the actual conditions of the upper ambient air provided by the GPS ground unit 12 to correct the ascension profile previously determined on the basis of the data on the actual conditions of the upper ambient air provided by the GPS ground unit 12, and determines an initial quantity of Helium gas to be contained in the Helium room 17 conforming to the latest actual conditions of the upper ambient air. Then, the Helium controller 14 controls the motor-operated valve 18 attached to the Helium room 17 to set an initial buoyancy by adjusting the quantity of Helium gas contained in the Helium room 17 to the thus determined initial quantity of Helium gas. Thus, the ascension profile conforming to the latest actual conditions of the upper ambient air can be set for the airship 15 immediately before launching the airship 15.

FIGS. 4A to 4J show diagrams showing ascension profiles determined by simulation using data determined by the hull parameter setting method as an embodiment according to the present invention. A flight test place was set at Hitachi-shi, Ibaraki-ken, and flight test date and time were set at 6 am on Jun. 7, 2000 for stratospheric flight tests. The Helium quantity was varied automatically according to input data on conditions of the atmosphere. The ascension profiles were calculated by simulation for buoyancies of 40 kgf, 60 kgf, 80 kgf, 100 kgf, 120 kgf, 140 kgf, 160 kgf, 180 kgf and 200 kgf. Shown also in FIGS. 4A to 4J are drop distribution analysis data that are important factors of determination.

The ascension rate of the airship 15 must be adjusted in response to sudden change in the actual conditions of the upper ambient air when the airship 15 is launched after thus setting the hull parameters. An ascension rate adjusting method according to the present invention adjusts the ascension rate by changing the number of the operating air relief valve 20, by combining motor-operated valves with the air relief valves 20 to inhibit discharging air at a predetermined pressure difference, by combining electrical locking means with the air relief valves 20 to place restrictions on the operation of the air relief valves 20, by combining motors or the like with the air relief valves 20 to adjust the spring constants of the springs of the air relief valves 20, or by adjusting the air discharge characteristic of the air room 16 of the hull to adjust air discharge rate. If air is discharged from the air room 16 at a high discharge rate, i.e., if the number of operating air relief valves 20 is large or the set pressure of the air relief valves 20 is low, the density of the hull decreases at a high reduction rate, the buoyancy increases accordingly, and the ascension rate of the airship 15 increases.

Figure 5:
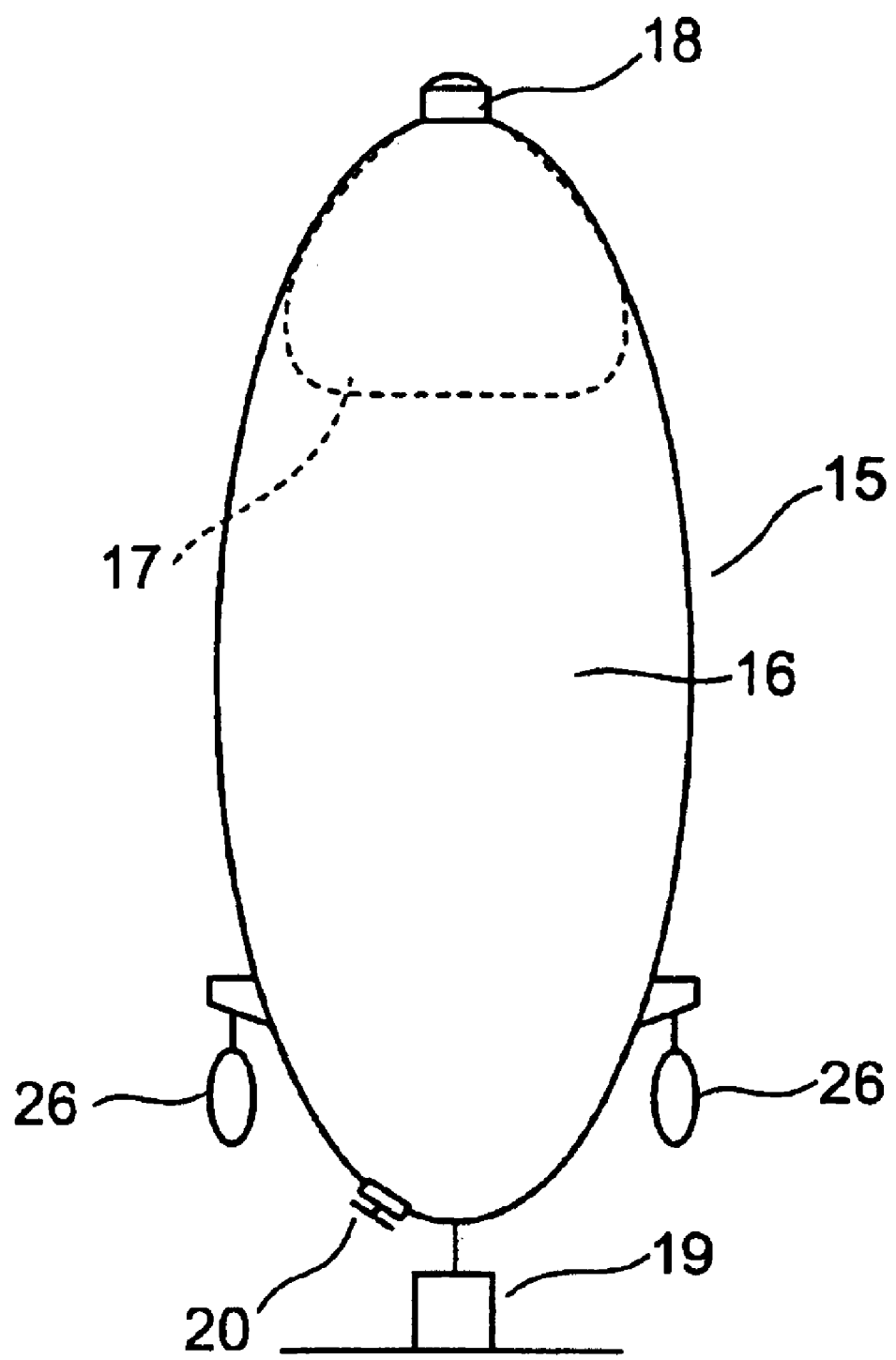
FIG. 5 is a schematic view of an airship loaded with ballast when the airship has a spare takeoff weight before launching the airship for which hull parameters are set.
Figure 6:
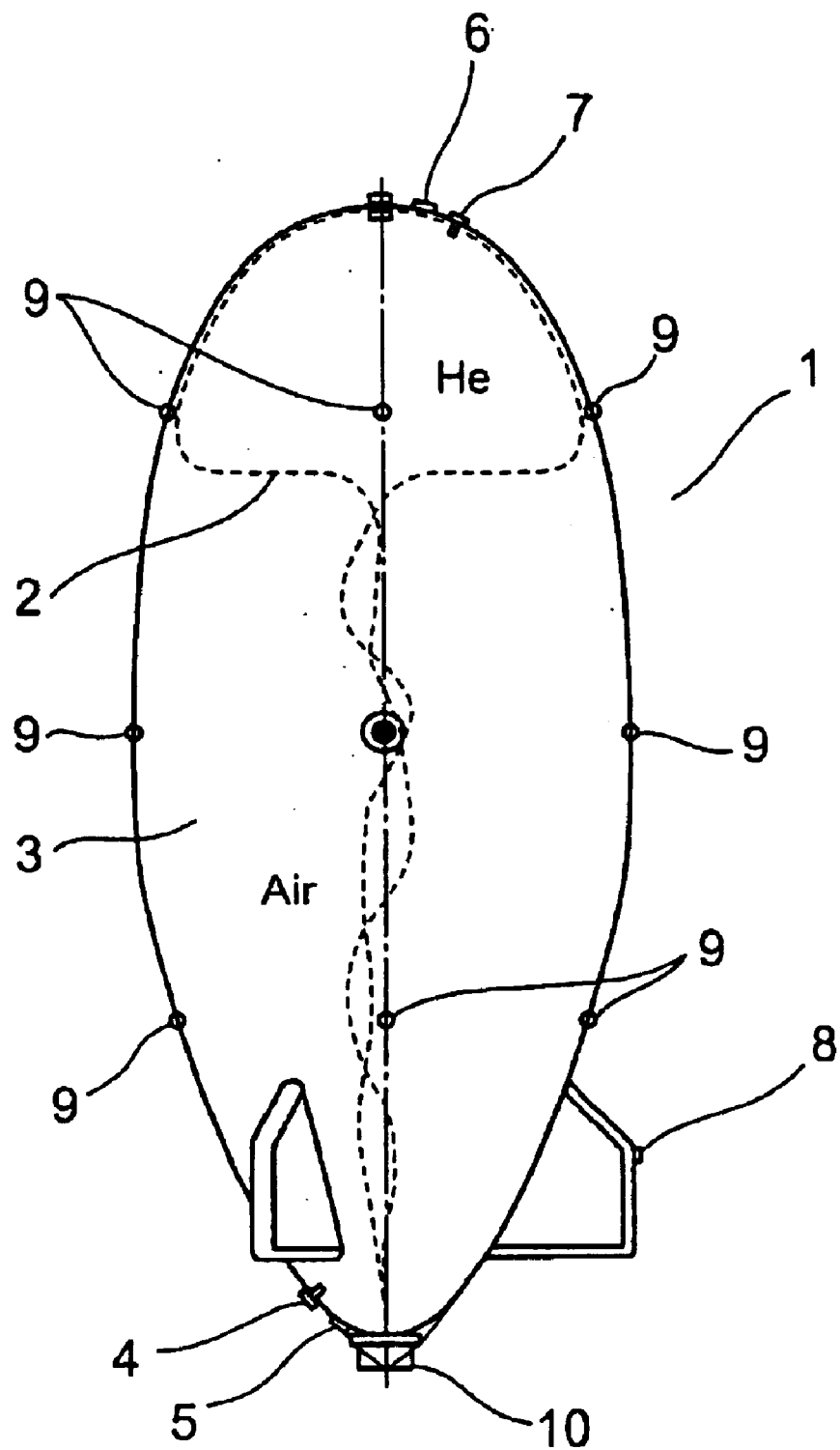
FIG. 6 is view of a very large conventional airship having a hull provided with a Helium room and an air room separated from the Helium room.
Figure 7A:
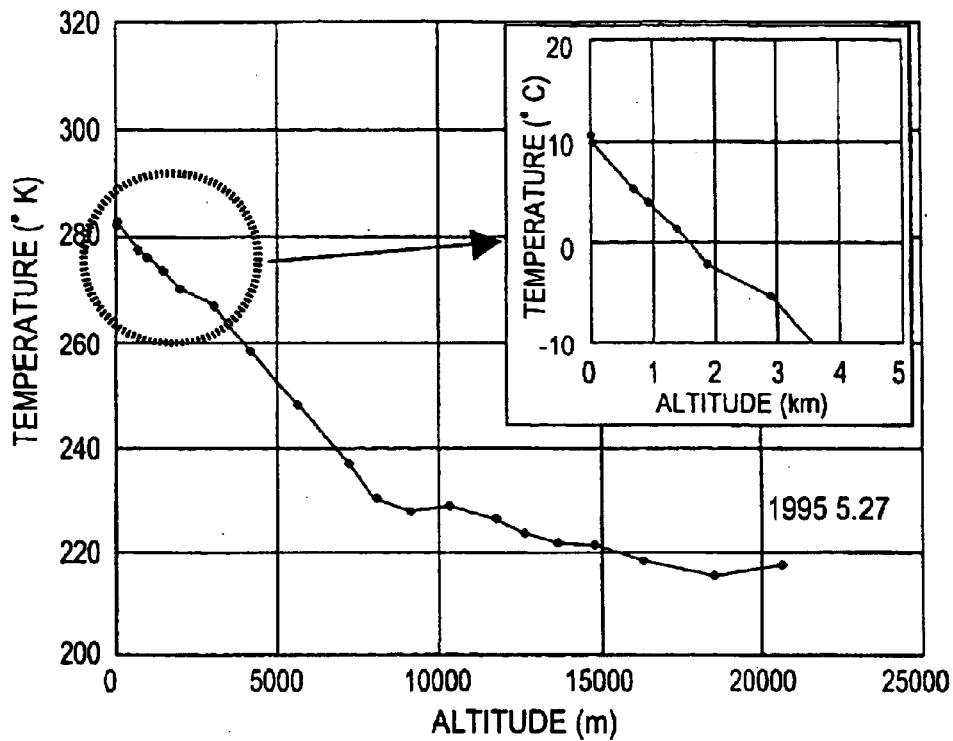
FIGS. 7A and 7B are a graph showing the variation of temperature with altitude determined by simulating the actual atmosphere at Nemuro, Hokkai-do on May 27, 1995, and a graph showing the relation between altitude, speed, pressure difference, and time elapsed after the airship has started ascending, respectively.
Figure 7B:
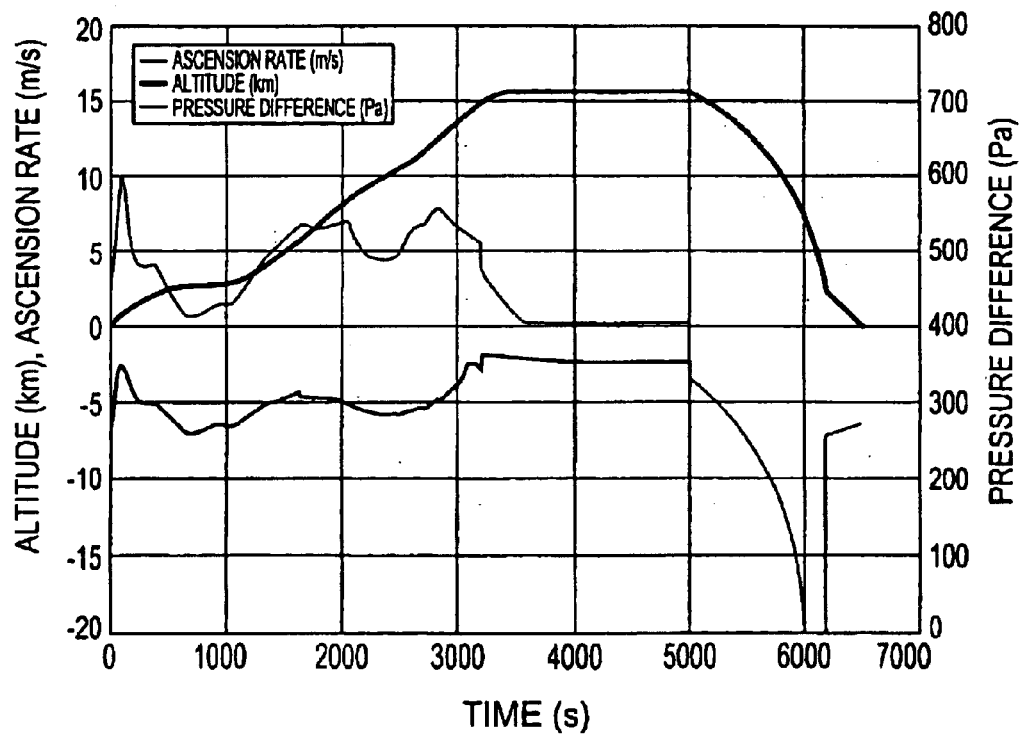
Figure 8A:
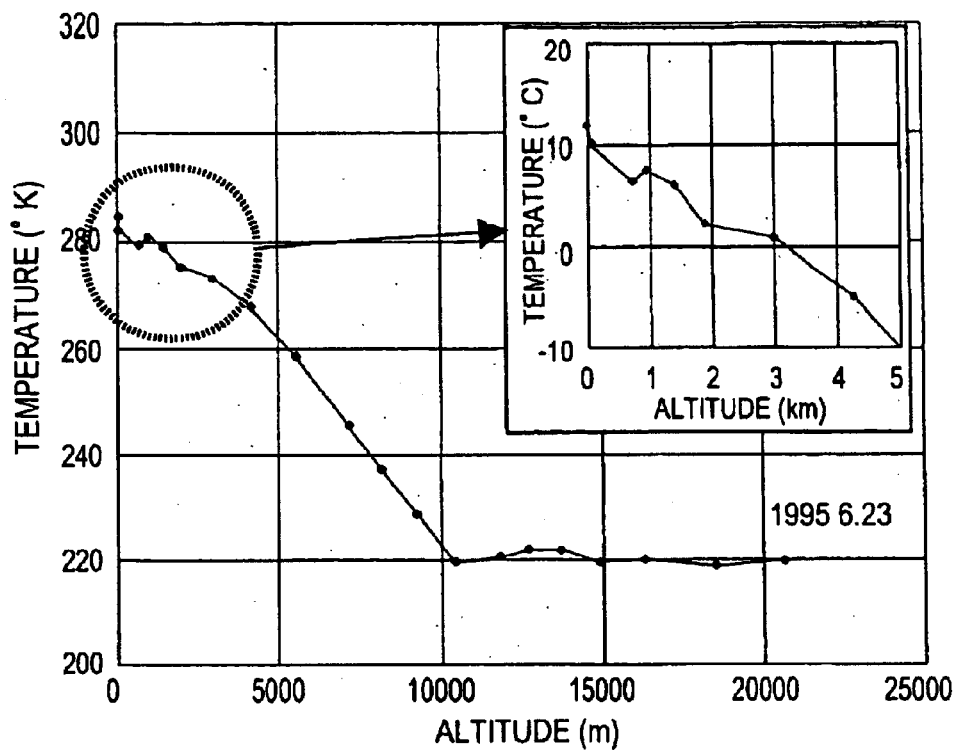
FIGS. 8A and 8B are a graph showing the variation of temperature with altitude determined by simulating the actual atmosphere at Nemuro, Hokkai-do on Jun. 23, 1995, and a graph showing the relation between altitude, speed, pressure difference, and time elapsed after the airship has started ascending, respectively.
Figure 8B:
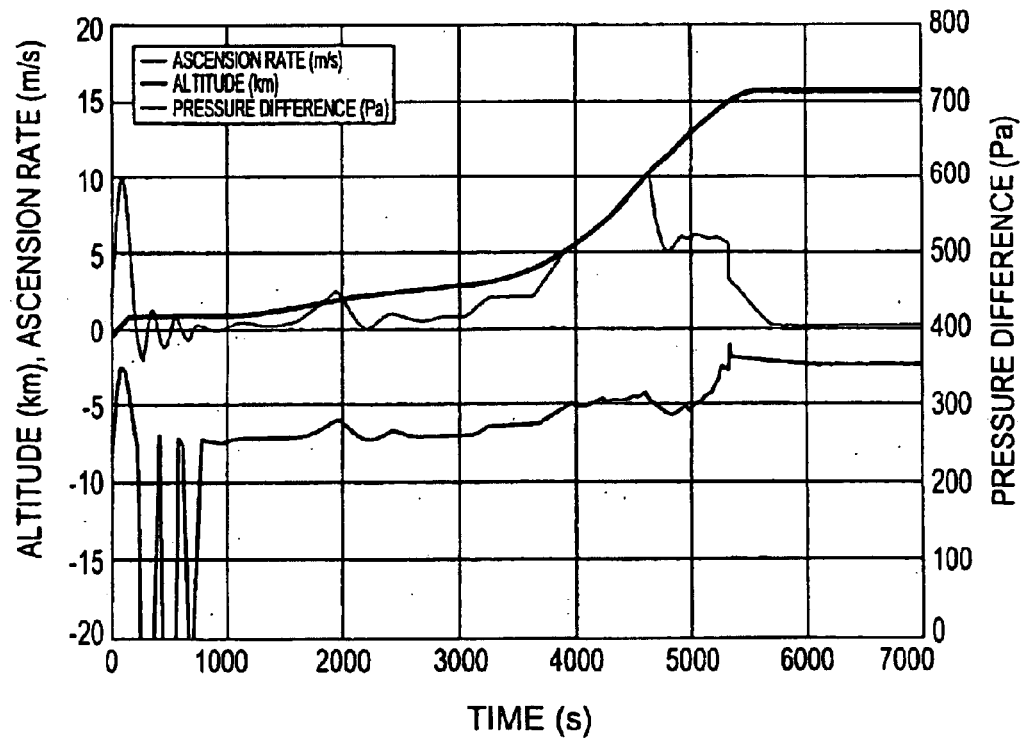
Figure 9A:
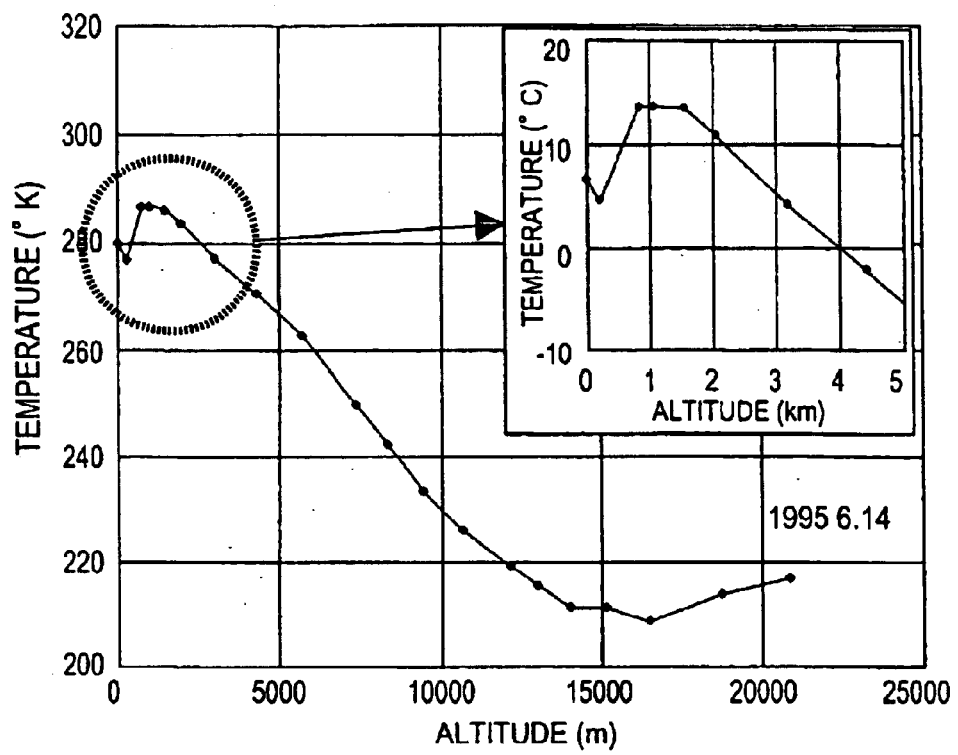
FIGS. 9A and 9B are a graph showing the variation of temperature with altitude determined by simulating the actual atmosphere at Nemuro, Hokkai-do on Jun. 14, 1995, and a graph showing the relation between altitude, speed, pressure difference, and time elapsed after the airship has started ascending, respectively.
Figure 9B:
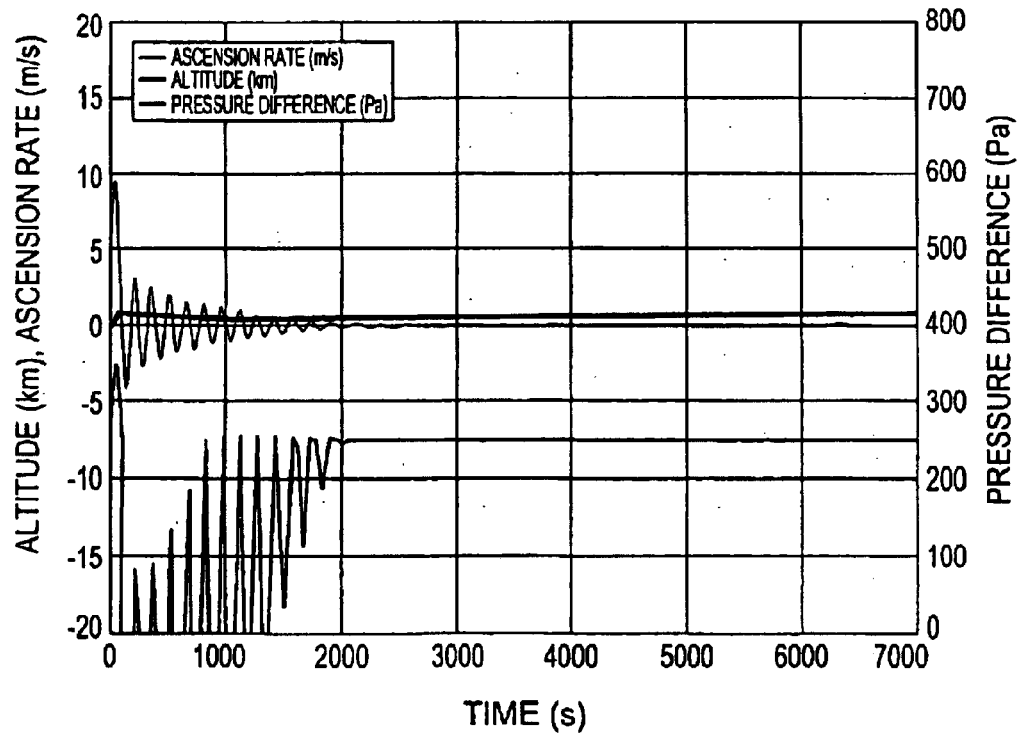

Another ascension rate adjusting method as an embodiment according to the present invention uses, as shown in FIG. 5, ballast 26, such as water, loaded on the airship 15 when the airship has a spare takeoff weight. If the ascension rate of the airship 15 decreases suddenly at an altitude while the airship 15 is ascending, the ballast 26 is thrown out to increase the buoyancy. Consequently, the airship 15 is able to ascend without staying at the altitude.

As apparent form the foregoing description, the hull parameter setting method of the present invention adjusts the initial quantity of Helium gas to determine an optimum buoyancy conforming to the actual conditions of the upper ambient air immediately before launching the airship, which could not be done by the conventional hull parameter setting method. Thus, an optimum ascension profile is determined for the airship, and hull parameters suitable for ascension can be determined.

The hull parameter setting system of the present invention is capable of readily carrying out the hull parameter setting method of the present invention with high reliability.

The hull parameter setting method and the hull parameter setting system of the present invention are capable of providing information including the number of days suitable for testing and whether or not a designed hull is able to ascend according to a suitable ascension profile, and useful in making a test program by simulation using data on the conditions of the atmosphere at a test place, in a planned test month and at set time. Thus, the present invention increases chances to launch the airship and ensures high reliability of launching.

The ascension rate adjusting method of the present invention adjusts the ascension rate of the airship for which the hull parameters have been set by adjusting the number of the operating air relief valves, the operating characteristics of the air relief valves or increasing the buoyancy of the airship by throwing out the ballast in response to the sudden change in the actual conditions of the ambient air while the airship is ascending. Thus, the satisfactory ascension of the airship can be ensured.

Although the invention has been described in its preferred embodiments with a certain degree of particularity, obviously many changes and variations are possible therein. It is therefore to be understood that the present invention may be practiced otherwise than as specifically described herein without departing from the scope and spirit thereof.

What is claimed is:

1. A hull parameter setting method of setting parameters of a hull of an airship provided with a Helium room and an air room separate from said Helium room, comprising:

launching observation means configured to observe upper ambient air environment immediately before launching said airship in order to acquire ambient air data on actual conditions of upper ambient air including altitude, pressure, wind direction, wind speed and temperature;

determining an ascension profile for said airship by a simulation using said ambient air data on said actual conditions of said ambient air;

determining an initial quantity of a Helium gas in said Helium room of said airship conforming to said actual conditions of said ambient air; and adjusting a quantity of said Helium gas contained in said Helium room to said initial quantity of said Helium gas to set an initial buoyancy.

2. The hull parameter setting method according to claim 1 further comprising:

observing changes in said upper ambient air with a meteorological observation instrument in a period between a completion of adjustment of said initial quantity of said Helium gas and a launching of said airship after acquisition of said ambient air data on said actual conditions of said ambient air using said observation means;

correcting said ascension profile for said airship by a simulation using both said ambient air data on said actual conditions of said ambient air and a data on said upper ambient air obtained by observing said changes in said upper ambient air with said meteorological observation instrument;

determining an initial quantity of Helium gas in said Helium room conforming to latest conditions of said upper ambient air; and adjusting said quantity of Helium gas in said Helium room to said initial quantity of Helium gas to set said initial buoyancy.

3. The hull parameter setting method according to claim 1, wherein said observation means includes a GPS sonde.

4. A hull parameter setting system for setting hull parameters for a hull of an airship comprising:

an observation system including observation means configured to observe upper air environment that is launched in order to obtain ambient air data on actual conditions of an upper ambient air including altitude, pressure, wind direction, wind speed and temperature;

a simulator installed on a ground to determine an ascension profile for said airship by a simulation using said ambient air data on said actual conditions of said upper ambient air provided by said observation system and to determine an initial quantity of Helium gas in said Helium room conforming to said actual conditions of said upper ambient air; and a Helium gas controller installed on said ground or said hull to adjust a quantity of Helium gas in said Helium room according to said initial quantity of Helium gas determined by said simulator.

5. The hull parameter setting system according to claim 4 further comprising a meteorological observation system including a meteorological observation instrument for observing changes in said upper ambient air in a period between a completion of adjustment of said quantity of Helium gas and a launching of said airship after said acquisition of said ambient air data on said actual conditions of ambient air and sending a data on said upper ambient air obtained by said meteorological observation system to said simulator.

6. The hull parameter setting system according to claim 4, wherein said observation means includes a GPS sonde.

7. An ascension rate adjusting method adapted to be used to adjust an ascension rate of an airship of which hull parameters are set by said hull parameter setting method as defined in claim 1, wherein said ascension rate at which said airship ascends is adjusted according to changes in actual conditions of ambient air by adjusting a number of air relief valves to be operated among a plurality of air relief valves of said airship or adjusting characteristics of said air relief valves to adjust air discharge rate.

8. The ascension rate adjusting method according to claim 7, wherein said observation means includes a GPS sonde.

9. An ascension rate adjusting method adapted to be used to adjust an ascension rate of an airship of which hull parameters have been set by said hull parameter setting method as defined in claim 1, wherein said airship is loaded with a ballast if said airship has a spare takeoff weight, and said ballast is thrown out when said ascension rate of said airship decreases during ascension to increase a buoyancy of said airship and to increase an ascending ability of said airship.

10. The ascension rate adjusting method according to claim 9, wherein said ballast includes water.

11. The ascension rate adjusting method according to claim 9, wherein said observation means includes a GPS sonde.

* * * * *